United States Patent [19]

Ohta et al.

[11] Patent Number: 4,597,794
[45] Date of Patent: Jul. 1, 1986

[54] RECORDING PROCESS AND A RECORDING LIQUID THEREOF

[75] Inventors: Tokuya Ohta, Yokohama; Yasuhiro Yano, Naka; Yohji Matsufuji, Tokyo; Masahiro Haruta, Funabashi; Tsuyoshi Eida, Chiba, all of Japan

[73] Assignee: Canon Kabushiki Kaisha, Tokyo, Japan

[21] Appl. No.: 628,114

[22] Filed: Jul. 3, 1984

Related U.S. Application Data

[63] Continuation of Ser. No. 532,298, Sep. 14, 1983, abandoned, which is a continuation of Ser. No. 251,090, Apr. 6, 1981, abandoned.

[30] Foreign Application Priority Data

| | | | |
|---|---|---|---|
| Apr. 17, 1980 | [JP] | Japan | 55-51891 |
| Apr. 17, 1980 | [JP] | Japan | 55-51892 |
| Apr. 17, 1980 | [JP] | Japan | 55-51895 |
| Apr. 17, 1980 | [JP] | Japan | 55-51897 |
| May 6, 1980 | [JP] | Japan | 55-59602 |
| May 6, 1980 | [JP] | Japan | 55-59603 |
| May 7, 1980 | [JP] | Japan | 55-60431 |

[51] Int. Cl.$^4$ .......................... C09D 11/02
[52] U.S. Cl. .......................... 106/20; 106/22; 260/DIG. 38; 523/160; 524/556
[58] Field of Search .......................... 106/22; 260/DIG. 38; 523/160; 524/556

[56] References Cited

U.S. PATENT DOCUMENTS

| | | | |
|---|---|---|---|
| 3,846,141 | 11/1974 | Ostergren et al. | 106/22 |
| 4,150,997 | 4/1979 | Hayes | 106/20 |
| 4,153,593 | 5/1979 | Zabiak et al. | 106/21 |
| 4,176,361 | 11/1979 | Kawada et al. | 346/1.1 |
| 4,279,653 | 7/1981 | Makishima et al. | 106/22 |
| 4,281,329 | 7/1981 | Yano et al. | 346/1.1 |

OTHER PUBLICATIONS

Billmeyer, Jr., Textbook of Polymer Sci., pp. 53-87.

*Primary Examiner*—Amelia B. Yarbrough
*Attorney, Agent, or Firm*—Fitzpatrick, Cella, Harper & Scinto

[57] ABSTRACT

In an ink-jet recording process which comprises forming droplets of an ink and recording on an image receiving material by using the droplets, said ink is prepared by dispersing fine particles of pigment into aqueous dispersion medium containing polymer having both a hydrophilic and a hydrophobic construction portion. An average particle size (D micron) of the pigment and an average molecular weight of the polymer satisfy the relationship represented by the following equation.

$$D \times 5 \times 10^2 \leq W$$

And the ratio of molecular weight of the pigment to average molecular weight of the polymer is a value in the range from 1:2 to 1:150.

13 Claims, 5 Drawing Figures

RECORDING PROCESS AND A RECORDING LIQUID THEREOF

This application is a continuation, of application Ser. No. 532,298 filed Sept. 14, 1983 which is a continuation of parent application Ser. No. 251,090 filed Apr. 6, 1981, both now abandoned.

BACKGROUND OF THE INVENTION

1. Field of the Invention

The present invention relates to an ink-jet recording process carried out by using a recording liquid (hereinafter simply referred to as an "ink") of a pigment type, and to an ink of a pigment type thereof.

2. Description of the Prior Art

Among the known various recording processes, the so-called ink-jet recording process is recognized as an extremely useful recording process, since the recording can be carried out at non-impact without generating noise and at high speed, and made on plain paper without any particular fixing treatment. Heretofore, various ink-jet recording processes have been proposed. Some are used in practice and some are still under development.

In the ink-jet recording process, recording is carried out by a process in which droplets of a recording liquid called an ink are flown by various actuating principles to deposit onto an image recording member such as paper, and the like. And in the ink-jet recording process, several processes for forming droplets are used. An embodiment is shown in FIG. 1.

FIG. 1 shows an apparatus in which a recording signal is applied to a recording heat section having a piezo-oscillator and droplets of a recording liquid are generated according to the signal to effect recording. In FIG. 1, a recording head 1 is provided with a piezo-oscillator 2a, a vibrator 2b, an inlet 3 for a recording liquid, a liquid chamber 4 in the head and a liquid ejecting portion (ejecting orifice) 5. A recording liquid 7 stored in a storage tank 6 is introduced into liquid chamber 4 through a feed pipe 8. If necessary, feed pipe 8 may be provided with intermediate treating means 9 such as pumps, filters, and the like. To piezo-oscillator 2a is applied a signal which is transduced from a recording signal S to a pulse by signal proceeding means 10 (for example pulse transducer) to generate pressure change for a recording liquid in liquid chamber 4 according to the signal. As the result, recording liquid 7 is ejected as droplets 11 from ejecting orifice 5 to effect recording on surface of an image recording member 12.

There are known various apparatuses other than the abovementioned apparatus. For example, FIG. 2 shows a modified embodiment of that in FIG. 1. In the modified embodiment, a liquid chamber 4 is of a nozzle form, and around it is a cylindrical piezo-oscillator (in this apparatus, a mechanism generating droplets is essentially the same as that shown in FIG. 1). Also known are an apparatus in which charged droplets are continuously generated in order to use a portion of the droplets for recording, another apparatus in which heat energy corresponding to a recording signal is applied to a recording liquid in a chamber of a recording head inorder to generate droplets by the heat energy, and the like.

An embodiment is shown in FIGS. 3A, 3B, and 4.

A head 13 is manufactured by jointing a plate such as glass, ceramics, plastics, and the like, having a groove 14 to a heat-generating head 15 used for a heat-sensitive recording process (in FIGS. 3A and 3B, a thin film head is shown, however a heat-generating head is not restricted to this construction). Heat-generating head 15 is constituted of a protective film 16 made of silicon oxide and the like, aluminum electrodes 17-1 and 17-2, a resistive heater layer 18 made of nichrome and the like, a heat-accumulating layer 19, and a substrate 20 having an excellent heat-releasing property such as alumina and the like.

An ink 21 arrives at an ejecting orific 22, so that a meniscus 23 is formed by a pressure P.

When an electric signal is applied to electrodes 17-1 and 17-2, a region represented by a character n generates suddenly heat to generate bubbles in an ink 21 contacting with n. Meniscus 23 is projected by the pressure. Recording droplets 24 of ink 21 are ejected from orifice 22 to fly toward an image recording material 25. FIG. 4 shows an appearance view of a multi head in which a large number of heads shown in FIG. 3A are arrayed. The multi head is manufactured by jointing a glass plate 27 having a large number of grooves 26 to a heat-generating head 28 similar to that described in FIG. 3A.

FIG. 3A is a sectional view of head 13 and is taken along the ink flow-path. FIG. 3B is a sectional view of FIG. 3A, the view being taken along A-B of FIG. 3A.

An ink applied to the abovementioned ink-jet recording process essentially comprises dye and a solvent therefor. The ink characteristics are considerably dependent upon the characteristics of the dye. Therefore, when an ink-jet recording is carried out by using an ink which contains mainly a water-soluble dye, properties of the obtained ink images depend upon the properties of the water-soluble dye. Accordingly, the ink images are inferior in water-resistance and light fastness. Storage stability of an ink per se containing such water-soluble dye is not so excellent. For these reasons, instead of such dye type ink, an ink-jet recording process has been recently proposed in which a pigment-type ink is used. The pigment-type ink has the advantages that images obtained by the pigment-type ink are extremely excellent in water resistance and light fastness in comparison with images obtained by the dye-type ink. However, since pigment is insoluble in mediums for the ink, complex techniques are required to achieve fine dispersion in the ink, and it is very difficult to enhance the stability of the dispersion.

Further, in ink-jet recording processes, the ink to be used is required to meet the following:

the ink has physical properties (viscosity, surface-tension, electrical conductivity, and the like) of the liquid, which agree with ejecting conditions (driving voltage and driving frequency for a piezo-element, form, size, and material of an ejecting orifice, and the like; and the ink has excellent storage stability for a long period and does not clog in an ink-jet apparatus fixing toward image recording material (paper, fabric, film etc.) can be carried out speedily and surely, a printed dot is smooth at the border thereof, and spreading of the ink is slight;

the printed ink images are clear in color tone and have high density;

the printed ink images are excellent in water resistance and light fastness;

the ink does not corrode materials (storage tank, connection tube, seal, etc.) which contact with the ink; and the ink is essentially odorless and harmless, and excellent in safety such as inflammability and the like.

Further, in case the image receiving materials are fabric, washing (including dry cleaning) resistance is required.

It is considerably difficult to satisfy simultaneously the abovamentioned characteristics. The conventional techniques are unsatisfactory to these points.

SUMMARY OF THE INVENTION

It is an object of the present invention to provide an ink-jet recording process carried out by using an ink capable of eliminating the abovementioned drawbacks of the conventional processes, which satisfies ejection stability, storage stabilit for a long period, fixability, and density, clearness, sharpness, water resistance, light fastness, washing resistance, and the like of printed images, and which is odorless and harmless, and excellent in safety such as inflammability and the like, in practice.

It is another object of the present invention to provide a pigment type ink which satisfies ejection stability, storage stability for a long period, fixability, and density, clearness, sharpness, water resistance, light fastness, washing resistance, and the like of printed images, and which is odorless and harmless, and excellent in safety such as inflammability and the like, in practice.

It is a further object of the present invention to provide a pigment type ink which has excellent ability to in responded to driving frequency, and which can be used in hlgh speed operations.

According to one aspect of the present invention, there is provided an ink-jet recording process which comprises making droplets of an ink and recording on an image receiving material by using the droplets, said ink prepared by dispersing fine particles of pigment into aqueous dispersion medium containing polymer having both a hydrophilic and a hydrophobic construction portion.

DETAILED DESCRIPTION OF THE PREFERRED EMBODIMENTS

Figure 1:
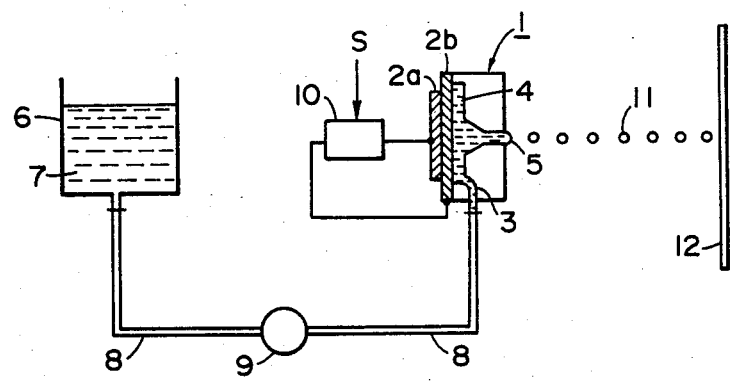
FIGS. 1 and 2 diagrammatically illustrate apparatuses used in conventional ink-jet recording process.

The pigment type ink according to the present invention is described in detail below.

Since pigment particles are insoluble in solvents such as water and the like, if pigment particles are simply mixed and dispersed into an ink medium, the pigment particles aggregate or settle immediately and to separate from the solvent. Therefore, an ink useful in practice can not be prepared. Accordingly, in preparing such pigment type ink, an excellent dispersion medium for pigment particles is required.

In the present invention, the first component of such dispersion medium is used a polymer (dispersing agent) having both a hydrophilic and a hydrophobic construction portion, and the second component of such dispersion medium is used an aqueous liquid.

The dispersion medium can disperse the pigment particles extremely stably, in a viscosity from about 1 to about 20 cps.

Representative polymers used as the first component of the dispersion medium are polymers of monomers having mainly additively polymerizable vinyl group, into which hydrophilic construction portions such as carboxylic acid group, sulfonic acid group, sulfate group, and the like are introduced by usin a predetermined amount of $\alpha$, $\beta$-unsaturated monomer such as acrylic acid, methacrylic acid, crotonic acid, itaconic acid, itaconic acid monoester maleic acid, maleic acid monoester, fumaric acid, fumaric acid monoester, vinyl sulfonic acid, sulfoethyl methacrylate, sulfopropyl methacrylate, sulfonated vinylnaphthalene, and the like.

On the other hand, monomers introducing hydrophobic construction portions are preferably selected from the group of styrene, styrene derivatives, vinylnaphthalene, vinylnaphthalene derivatives, and $\alpha$, $\beta$-ethylenic unsaturated carboxylate of aliphatic alcohol having $C_8$–$C_{18}$. In addition to the abovementioned monomers, there are usable, for example, acrylonitrile, vinylidene chloride, $\alpha$, $\beta$-ethylenic unsaturated carboxylate, vinyl acetate, vinyl chloride, acrylamide, methacrylamide, hydroxyethyl methacrylate, hydroxypropyl methacrylate, glycidyl methacrylate, N-methylol acrylamide, N-butoxymethyl acrylamide, and the like.

In view of washing resistance for a matter printed by the ink according to the present invention, it is preferable to use a copolymer containing N-methylol acrylamide or N-methylol methacrylamide.

Next, in the present invention, it is required to form salt. of the polymer for the purpose of solubilizing or colloidally dispersing the polymer into an aqueous liquid which is the second component.

Representative counter components forming salts with the abovementioned polymer are alkali metals such as Na and K, aliphatic amines such as mono-, di-, or tri-methylamine, and mono-, di-, or tri-ethylamine, alcohol amines such as mono-, di-, or tri-ethanolamine, mono-, di-, or tri-propanolamine, methyl ethanolamine, or dimethyl ethanolamine, morpholine, N-methyl morpholine, and the like.

In the abovementioned polymer, the ratio of monomer unit constituting hydrophilic construction portion is a matter of great importance. In other words, when the weight ratio of the monomer units constituting hydrophilic construction portion such as carboxylic group, sulfonic group, and sulfonate group exceeds 40% by weight, the adsorption property of the polymer towards pigment particles is decreased yielding poor dispersion stability of the pigment particles. On the contrary, when the weight ratio of the monomer units constituting the hydrophilic construction portion is decreased to 2% by weight or less, the solubility of the polymer per se in aqueous liquid is decreased so that the polymer aggregates or settles together with pigment particles in the aqueous liquid. Therefore, in the abovementioned polymer, the more preferable ratio of the hydrophilic construction portion seems to range from about 20 to about 40% by weight.

When the polymer has too low of a molecular weight, such polymer does not contribute to the dispersion stability of the pigment particles. On the contrary, when the polymer has too high of a molecular weight, such polymer tends to increase the viscosity of the ink per se excessively (for example, higher than 20 cps.). Accordingly, in the present invention, it is preferable that the molecular weight of the polymer ranges between about 1,000 to 100,000.

When aromatic rings are introduced into the hydrophobic construction portions of the polymer, it is confirmed that such polymer exerts a high effect as a dispersing agent for the pigment in a mixed solvent (water/water-soluble organic solvent). Such effect is considered to result mainly from surface bond. based on an aromatic ring in the side-chain of the polymer. In other words, adsorption action occurs because of the surface bond energy between pigment molecule and aromatic ring in lipophilic group of the polymer, on the other hand, the hydrophilic portion facing outwards toward the pigment particle is bonded with water or other aqueous organic solvent. As the result, pigment tends to disperse in the ink. Thus, particles whose outside is covered by hydrophilic group;are suspended, and a mutual repulsion occurs to retain dispersion stability for a long period.

It has been found that an ink resulting from such mixed solvent has considerably excellent stability in the case of viscosity about 10 cps, in comparison with that resulting from a solvent consisting of water.

Preferable aromatic rings introduced into the hydrophobic construction portion are the following:

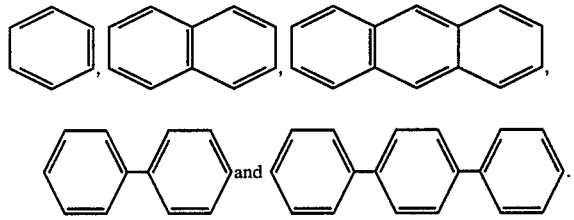

Representative hydrophobic monomers which are useful in the abovementioned case are stylene, vinyl biphenyl, vinyl naphthalene, vinyl anthracene, vinyl terphenyl, vinyl phenanthrene, vinyl tetracene, and derivatives thereof.

Such polymers can be perpared by the following method. For example, the essential monomer components are mixed in a desired ratio, and the polymer having the desired molecular weight is prepared by a method such as solution polymerization, emulsion polymerization, suspension polymerization, and the like (if necessary, by using a polymerization regulator). In addition, the following processes can be accepted. Polymers containing acid anhydride, ester group, nitrile group, hydroxyl group, and the like are prepared in a first step, and sequently these groups are subject to hydrolysis, saponification, sulfation, or sulfonation to obtain carboxyl groups and the like in the polymer in a second step. And amine salt can be prepared in any step. For example, polymerization is carried out by using amine salt of the abovementioned carboxylic acid monomer, amine is added to an obtained polymer of the abovementioned hydrolyzed polymer, or amine is added after addition of pigment particles. Any process is acceptable.

With regard to the pigment type ink, it has been found that the stability and the ability to respond to driving frequency of a dispersion liquid are considerably influenced by the ratio of the average particle size of the pigment particles in the dispersion liquid to be an ink and the average molecular weight of the polymer. In other words, pigment particles in a dispersion liquid have some average particle size. When the average molecular weight of the polymer has a constant relationship to the average particle size of the pigment particles, it has been found that the dispersion liquid resulting from the polymer and the pigment has excellent stability and ability to respond to driving frequency on ejection. By a detailed study, when the average particle size of the pigment particles (D in micron) and an average molecular weight (W) of the polymer satisfy the following equation, $$D \times 5 \times 10^2 \leqq W \qquad (1)$$

it has been found that the dispersion liquid resulting from the pigment and the polymer has excellent stability and ability to respond to driving frequency on ejection. On the other hand, it has been found that the ability to respond to driving frequency of a dispersion liquid resulting from a pigment and a polymer tends to decrease with the deviation of D and W from the equation (1).

Further, by another detailed study, it has been found that the $W_1/W_2$ ratio of the molecular weight ($W_1$) of a pigment to the average molecular weight ($W_2$) of the polymer has a close relationship to the storage stability and the ability to respnd to the driving frequency of the dispersion liquid resulting from the pigment and the polymer. In other words, by studing various dispersion liquids prepared by varying the molecular weight of the pigment and the average molecular weight of the polymer, it has been found that a dispersion liquid having the abovementioned ratio $W_1/W_2$ of about $\frac{1}{2}$-1/150 is excellent in storage stability and in ability to respond to driving frequency, and storage stability and ability to respond to driving frequency tend to decrease with deviation from the abovementioned ratio range.

In an ink of the present invention, the abovementioned polymer is used in an amount of about 5–300 parts by weight, more preferably in an amount of about 10–150 parts by weight, per 100 parts by weight of pigment. If the amount of polymer exceeds the upper limit, color density of the ink becomes thin, and the viscosity of the ink can not be retained in the appropriate range. And, if the amount of polymer becomes lower than the under limit, the dispersion stability of the pigment particles becomes poor.

Examples of the aqueous liquid components constituting the ink according to the present invention are water and a mixture of water and a water-soluble organic solvent.

Representative examples of water-soluble organic solvents are: alcohols such as methyl alcohol, ethyl alcohol, n-propyl alcohol, isopropyl alcohol, n-butyl alcohol, sec-butyl alcohol, tert-butyl alcohol, iso-butyl alcohol, furfuryl alcohol, tetrahydrofurfuryl alcohol, and the like; ketones or alcohols as such acetone, methyl ethyl ketone, diacetone alcohol, and the like; alkanolamines such as monoethanolamine, diethanolamine, triethanolamine, and the like; amides such as dimethylformamide, dimethylacetoamide, and the like; ethers such as tetrahydrofurane, dioxane and the like; esters such as ethyl acetate, methyl benzoate, ethyl lactate, ethylene carbonate, propylene carbonate, and the like; polyhydric alcohols such as ethylene glycol, diethylene glycol, triethylene glycol, propylene glycol, tetraethylene glycol, polyethylene glycol, glycerol, 1,2,6-hexanetriol, thiodiglycol, and the like; lower alkyl mono- or di-ethers derived from alkylene glycols such as ethylene glycol mono-methyl (or -ethyl) ether, diethylene glycol mono-methyl (or -ethyl) ether, propylene glycol mono-methyl (or -ethyl) ether, triethylene glycol mono-meethyl (or -ethyl) ether, diethylene glycol di-methyl (or -ethyl) ether, and the like; nitrogen containing cyclic compounds such as pyrrolidione, N-methyl-2-pyrrolidone, 1,3-dimethyl-2-imidazolidinone, and the like.

Of these solvents, polyhydric alcohols or alkyl ethers of polyhydric alcohols are preferable for improving various characteristics required of the ink, and polyhydric alcohols such as ethylene glycohols are more preferable for the purpose. The content of the abovementioned components ranges generally 10-70% by weight per the total weight of the ink, preferably 20-50% by weight in order to reduce the temperature dependency of the physical properties of the ink.

And, the content of water ranges 5-90% by weight per the total weight of the ink, preferably 10-70%, and more preferably 20-70% by weight.

Further, all kinds of organic and inorganic pigments including well-known pigments can be used as pigments constituting the ink according to the present invention.

Representative examples of pigments are: azo type, phthalocyanine type, quinacridone type, anthraquinone type, dioxagine type, indigo type, thioindigo type, perynone type, perlene type, isoindolenone type, titanium oxide, cadmium type, ione oxide derivatives, carbon black, and the like.

These pigments are preferably used, since these pigments in an ink are present as fine particles having a particle size in the range of about several hundred microns to several microns and an obtained ink is an aqueous paste immediately after preparation. Taking coloring power and viscosity of an ink into consideration, a content of the pigment ranges preferably between about 3 to 30% by weight per total weight of the ink.

An ink of the present invention may additionally comprise, besides the abovementioned essential components, known additives such as surfactants, salts, synthetic and natural resin, various dyes, and the like.

An ink of the present invention comprising mainly the abovementioned components may be prepared by various processes mentioned below. The abovementioned components can be compounded by mill and/or grind by using ball-mill, roll-mill, speed line mill, homomixer, sand grinder, and the like.

A dispersion step for the pigment is carried out in a state where the content of the pigment is high. After dispersion, the resulting ink is diluted and controlled by addition of aqueous liquid so that the viscosity of the ink is finally controlled in the range of about 1-20 cps., preferably about 3-10 cps. in the thus obtained ink.

Even when the thus obtained ink is stored in a low vscosity range for a long period, it is not observed that the pigment particles aggregate or settle.

The resulting ink has the following characteristics: the ink has physical properties (viscosity, surface-tension, electric conductivity, and the like) of the liquid which agree with wide ejecting conditions (driving voltage and driving frequency of a piezo-element, form, size, and material of an ejecting orifice, and the like); the ink has excellent storage stability for a long period and does not clog in an ink-jet apparatus; fixing toward image recording material (paper, fabric, film etc.) can be carried out speedily and surely, a printed dot is smooth at the border thereof, and spreading of the ink is slight; the printed ink images are clear in color tone and have high density; the printed ink images are excellent in water resistance and light fastness; the ink does not corrode materials (storage tank, connection tube, seal, etc.) which contact with the ink; and the ink is essentially odorless and harmless, and excellent in safety such as inflammability and the like.

Examples for preparing polymer (dispersing agent), examples of commercial material, and examples for preparing the ink of the present invention are described in detail below. Examples of preparing dispersing agents ("parts" represent "parts by weight")

PREPARING EXAMPLE 1

In a separable four neck flask with a stirrer were placed 50 parts of water, 30 parts of isopropyl alcohol, 0.5 part of sodium dodecylbenzene sulfate, and 0.5 part of ammonium persulfate, and the mixture was heated to 60° C. Also, a mixture comprising five parts of styrene, nine parts of acrylic acid, and five parts of butyl acrylate were placed in a separating funnel, and gradually added dropwise to the flask in 60 minutes. After completing addition, the reaction mixture was heated up to 80° C., then polymerization was further carried out for two hours, while stirring. The molecular weight of the obtained polymer was about 50,000.

PREPARING EXAMPLE 2

In the same flask as that in Preparing Example 1 were placed 8 parts of methyl methacrylate, 5 parts of styrene, 15 parts of itaconic acid, one part of benzoylperoxide, one part of lauryl mercaptan, 50 parts of diacetone alcohol, and 20 parts of ethylene glycol, and then polymerization was carried out for six hours with blowing nitrogen gas. The molecular weight of the obtained polymer was about 30,000.

In the same manner as that in Preparing Example 2, polymers were obtained from the following materials.

| Preparing Example 3 | |
|---|---|
| Styrene | 10 parts |
| Acrylonitrile | 5 parts |
| Methacrylic acid | 10 parts |
| Hydroxyethyl methacrylate | 5 parts |
| Azo-bis-isobutyronitrile | 1 part |
| Ethylene glycol monomethyl ether | 19 parts |
| Butanol | 50 parts |
| (molecular weight: about 15,000) | |
| Preparing Example 4 | |
| Vinylnaphthalene | 10 parts |
| Dimethylaminomethacrylate | 5 parts |
| Maleic anhydride | 10 parts |
| Methyl ethyl ketone peroxide | 1 part |
| Isopropyl alcohol | 60 parts |
| Triethanolamine | 14 parts |
| (molecular weight: about 20,000) | |
| Preparing Example 5 | |
| Styrene | 10 parts |
| Maleic anhydride | 10 parts |
| Diethanolamine | 2 parts |
| Azo-bis-isobutyronitrile | 1 part |
| Ethyl acrylate | 5 parts |
| Ethyl carbitol | 23 parts |
| Ethylene glycol monomethyl ether | 50 parts |
| (molecular weight: about 30,000) | |
| Preparing Example 6 | |
| Styrene | 5 parts |
| Monoethyl itaconate | 5 parts |
| Methacrylic acid | 10 parts |
| 2-Ethylhexyl methacrylate | 10 parts |
| Benzoyl peroxide | 1 part |
| Thiomalic acid | 1 part |
| n-Propyl alcohol | 48 parts |

-continued

| | |
|---|---|
| Ethylene glycol | 20 parts |
| | (molecular weight: about 80,000) |
| Preparing Example 7 | |
| Styrene | 7 parts |
| Acrylonitrile | 5 parts |
| Methacrylic acid | 10 parts |
| N—Methylol acrylamide | 3 parts |
| Hydroxyethyl methacrylate | 5 parts |
| Azo-bis-isobutyronitrile | 1 part |
| Ethylene glycol monomethyl ether | 19 parts |
| Butanol | 50 parts |
| | (molecular weight: about 15,000) |
| Preparing Example 8 | |
| Vinylnaphthalene | 8 parts |
| Dimethylamino methacrylate | 5 parts |
| N—Methylol methacrylamide | 2 parts |
| Maleic anhydride | 10 parts |
| Methyl ethyl ketone peroxide | 1 part |
| Isopropyl alcohol | 60 parts |
| Triethanolamine | 10 parts |
| | (molecular weight: about 2,000) |
| Preparing Example 9 | |
| Styrene | 10 parts |
| Maleic anhydride | 10 parts |
| Diethanolamine | 2 parts |
| Azo-bis-isobutyronitrile | 1 part |
| Ethyl acrylate | 5 parts |
| Ethyl carbitol | 23 parts |
| Ethylene glycol monomethyl ether | 50 parts |
| | (molecular weight: about 80,000) |
| Preparing Example 10 | |
| Styrene | 5 parts |
| N—Methylol acrylamide | 5 parts |
| Monoethyl itaconate | 5 parts |
| Methacrylic acid | 5 parts |
| 2-Ethylhexyl methacrylate | 10 parts |
| Benzoyl peroxide | 1 part |
| n-Propyl alcohol | 48 parts |
| Ethylene glycol | 20 parts |
| | (molecular weight: about 8,000) |

Examples of commercially supplied hiqh molecular dispersing agents:

a. Condensate of sodium naphthalenesulfonate and formaldehyde.

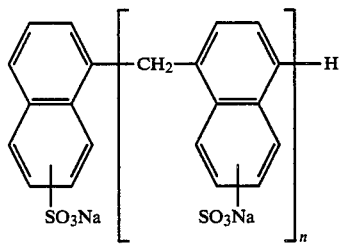

n = 3-10 b. Diisobutylene - maleic acid copolymer
trade name: DEMOL EP (KAO ATLAS INC.)
c. Sodium polyacrylate
trade name: NOPCO SANTO R (RAN NOPCO LIMITED)
d. Ammonium polyacrylate
trade name: NOPCO SANTO RFA (SAN NOPCO LIMITED)
e. Sodium polymethacrylate
trade name: PRIMAL 850 (ROHM & HAAS INC.)
f. Styrene - maleic acid copolymer (monoester ammonium salt)
trade name: SMA RESIN 1440H (ALCO CHEMICAL INC.)

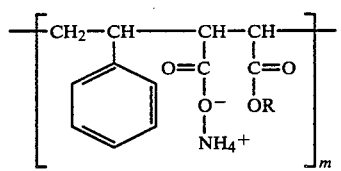

m = 6-8 g. PEG
trade name: MACROGOAL 1500 (NIPPON OILS & FATS CO., LTD.)
h. PEG - PPG blockcopolymer
trade name: UNIROOPE 40DP - 50B (NIPPON OILS & FATS CO., LTD.)

EXAMPLE 1

| | |
|---|---|
| Copper phthalocyanine blue (pigment) | 8 parts by weight |
| Polymer obtained in the Preparing Example 1 | 15 parts by weight |
| Dimethylethanolamine | 1 part by weight |
| Ethylene glycol | 10 parts by weight |
| Water | 19 parts by weight |

After the abovementioned components were all dispersed in a ball-mill for about 18 hours, one part of ethylene glycol and 26 parts of water were further added to obtain the pigment concentration of about 10% and dispersed for 30 minutes to obtain a blue pigment dispersion liquid.

The thus obtained dispersion liquid was centrifuged to obtain a recording liquid, from which non-dispersed particles were removed. (viscosity : about four cps.)

By using the recording ink, the tests ($T_1$–$T_5$) described below were carried out by a recording apparatus equipped with an on-demand type recording head (ejecting orifice of 50 microns in diameter, driving voltage for a piezo-oscillator of 60 volts, frequency of 4 KHz) which causes the recording liquid to be ejected by a piezo-oscillator. Excellent results were obtained for all cases. The diameter of the ejecting orifice may be set in a range of 10–200 microns.

$T_1$ (storage stability of recording liquid): The recording liquid sealed in a glass vessel was stored for six months at both temperatures of −30° C. and 60° C. No insoluble material separated out, nor did the physical properties and color of the recording liquid change.

$T_2$ (ejection stability): Continuous ejection was carried out for 24 hours at room temperature, 5° C., and 40° C., respectively. Under all of the conditions, highly excellent and stable recording could be accomplished throughout.

$T_3$ (ejection responsiveness): The ejection test was carried out for an intermittent ejection once every two seconds, and an ejection after the liquid stood in the orifice for two months. In no cases, was clogging at the tip of the orifice observed, and recording was carried out stably and uniformly.

$T_4$ (quality of recorded image): Images recorded on the image recording material listed in the following table had high density and were clear. After a recorded image was exposed for six months to light in a room, the decrease in the degree of the image density was less than 1%. In the case where a recorded image was dipped for one minute in water, spreading of the ink was slight.

T₅ (fixing ability to various image recording materials): After 15 seconds of printing, the printed portion of the image recording material listed in the following table was rubbed by finger to determine image sliding and spreading of the ink. No image sliding and spreading of the ink were observed, and the recording liquid showed excellent fixability.

| Image Recording Material | Type | Supplier |
|---|---|---|
| Gin Kan | Wood free paper (High class) | Sanyo-Kokusaku Pulp Co., Ltd. |
| Seven Star | Wood free paper (High class) | Hokuetsu Paper Mills, Ltd. |
| Shiro Botan | Middle class | Honshu Paper Mfg. Co., Ltd. |
| Toyo Roshi No. 4 | non-sized paper | Toyo Roshi Co., Ltd. |

EXAMPLE 2

In the same manner as in Example 1, the recording liquids of the following compositions were prepared, and the tests (T₁–T₅) were carried out on each of the resulting recording liquid. All the recording liquids showed excellent recording characteristics.

Figure 4:
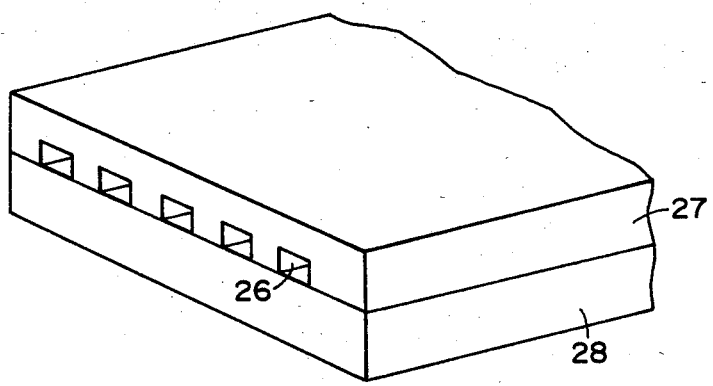
FIG. 4 is a perspective view of an appearance of an ink-jet apparatus in which the apparatuses shown in FIGS. 3A and 3B are multi-arrayed.

The tests were carried out in the same manner as in Example 1 by a recording apparatus shown in FIG. 4, equipped with an on-demand type of a multi recording head (ejecting orifice of 35 microns in diameter, heating resistor of 150 ohms in resistance value, driving voltage of 30 volts, frequency of 2 KHz) which generates droplets for recording by applying heat energy to the recording liquid in the recording head. Excellent results were obtained for all cases.

| Recording Liquid A1 | |
|---|---|
| Carbon black (pigment) | 10 parts by weight |
| Polymer obtained in Preparing Example 8 | 15 parts by weight |
| Dimethylaminoethanol | 1 part by weight |
| Ethylene glycol | 10 parts by weight |
| Water | 19 parts by weight |

After the abovementioned components were all dispersed in a ball-mill for about 18 hours, one part of ethylene glycol and 26 parts of water were further added to obtain the pigment concentration of about 10% and dispersed for 30 minutes to obtain a black pigment dispersion liquid. The thus obtained dispersion liquid was centrifuged to obtain a recording liquid, from which non-dispersed particles were removed. (viscosity: about 5 cps.)

| Recording Liquid B1 | |
|---|---|
| Copper phthalocyanine blue (pigment) | 15 parts by weight |
| Polymer obtained in Preparing Example 1 | 15 parts by weight |
| Morpholine | 1 part by weight |
| Ethylene glycol | 5 parts by weight |
| Diethylene glycol | 5 parts by weight |
| Water | 19 parts by weight |

After the abovementioned components were all dispersed in a sand-mill for about 18 hours, 25 parts of ethylene glycol, 5 parts of diethylene glycol and 80 parts of water were further added to obtain the pigment concentration of about 10% and dispersed for 30 minutes to obtain a blue pigment dispersion liquid.

The thus obtained dispersion liquid was centrifuged to obtain a recording liquid, from which non-dispersed particles were removed. (viscosity: about 6 cps.)

| Recording Liquid C1 | |
|---|---|
| Copper phthalocyanine blue (pigment) | 8 parts by weight |
| Polymer obtained in Preparing Example 6 | 10 parts by weight |
| N—Methylmorpholine | 1 part by weight |
| Ethylene glycol | 10 parts by weight |
| Water | 19 parts by weight |

After the abovementioned components were all dispersed in a ball-mill for about 15 hours, one part of ethylene glycol and 40 parts of water were further added to obtain the pigment concentration of about 10% and dispersed for 30 minutes to obtain a blue pigment dispersion liquid.

The thus obtained dispersion liquid was centrifuged to obtain a recording liquid, from which non-dispersed particles were removed. (viscosity: about 4.5 cps.)

| Recording Liquid D1 | |
|---|---|
| Quinacridone (pigment) | 8 parts by weight |
| Polymer obtained in Preparing Example 4 | 15 parts by weight |
| Dimethylaminoethanol | 1 part by weight |
| Ethylene glycol | 8 parts by weight |
| Diethylene glycol | 2 parts by weight |
| Water | 20 parts by weight |

After the abovementioned components were all dispersed in a sand-mill for about 2 hours, 5 parts of ethylene glycol and 30 parts of water were further added to obtain the pigment concentration of about 7% and dispersed for 30 minutes to obtain a red pigment dispersion liquid.

The thus obtained dispersion liquid was centrifuged to obtain a recording liquid, from which non-dispersed particles were removed. (viscosity: about 5 cps.)

| Recording Liquid E1 | |
|---|---|
| Carbon black (pigment) | 18 parts by weight |
| Polymer obtained in Preparing Example 5 | 20 parts by weight |
| Dimethylaminoethanol | 1 part by weight |
| Ethylene glycol | 10 parts by weight |
| Water | 20 parts by weight |

After the abovementioned components were all dispersed in a ball-mill for about 10 hours, 20 parts of ethylene glycol and 40 parts of water were further added to obtain the pigment concentration of about 8% and dispersed for 20 minutes to obtain a black pigment dispersion liquid.

The thus obtained dispersion liquid was centrifuged to obtain a recording liquid, from which non-dispersed particles were removed. (viscosity: about 8 cps.)

EXAMPLE 3

12 parts by weight of polymer liquid obtained in Preparing Example 1, 12 parts by weight of ethyl cellosolve, 20 parts by weight of water and 5 parts by weight of Quinacridone pigment were all mixed and stirred in a ball-mill for 12 hours.

Further, 20 parts by weight of water and 14 parts by weight of ethyl cellosolve were added to obtain the pigment concentration of 6% by weight and stirred for one hour to obtain a red dispersion liquid. The thus obtained dispersion liquid was ultra-centrifuged to obtain a ink for ink-jet system, from which coarse particles were removed. The dispersion liquid had a pigment concentration of about 6% by weight, a viscosity of 4.7 cps. and a surface tension of 40 dyne/cm.

Figure 2:
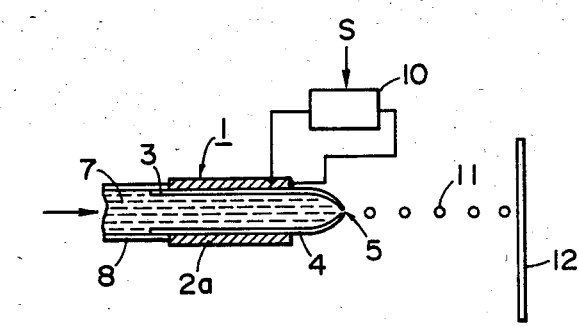
Figure 3A:
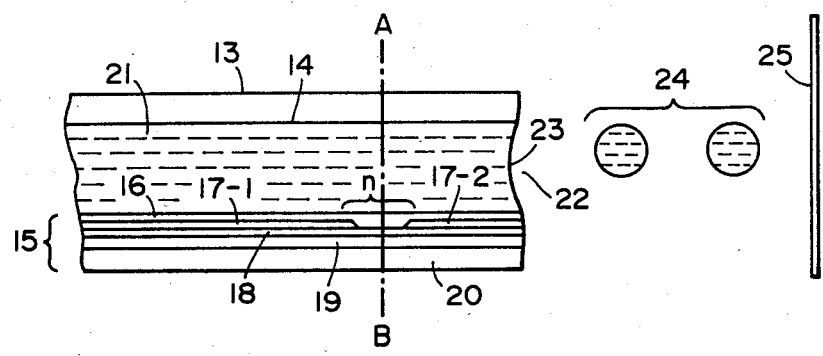
FIGS. 3A and 3B illustrate a vertical section and a transverse sectional view, respectively, of an important portion of another ink-jet recording apparatus.
Figure 3B:
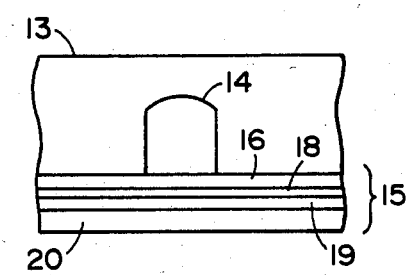

By using the resulting ink liquid, the tests $T_1$-$T_5$ were carried out in the same manner as in Example 1 by a ink-jet apparatus corresponding to the abovementioned FIG. 2, under the conditions of applied voltage of 40 volts and frequency of 2 KHz. The ink liquid showed excellent recording characteristics.

EXAMPLE 4

In the same manner as in Example 1, the recording liquids of the following compositions of A2–D2 were prepared and the tests $T_1$-$T_5$ were carried out on each of the resulting liquids. All of the recording liquids showed excellent recording characteristics.

And, by using the recording liquid, the tests were carried out in the same manner as in Example 1 by a recording apparatus shown in FIG. 4, equipped with an on-demand type of a multi recording head (ejecting orifice of 35 microns in diameter, heating resistor of 150 ohms in resistance value, driving voltage of 30 volts, frequency of 2 KHz) which generates droplets for recording by applying heat energy to the recording liquid in the recording head. Excellent results were obtained for all cases.

| Recording Liquid A2 | |
|---|---|
| Yellow lake | 10 parts by weight |
| Polymer obtained in Preparing Example 2 | 15 parts by weight |
| Water | 20 parts by weight |
| Dibutyl carbitol | 15 parts by weight | were mixed and stirred in a sand-mill for 18 hours, further 20 parts of water and 15 parts of dibutyl carbitol were added to obtain the pigment concentration of about 10% and stirred for 30 minutes. The thus obtained aqueous pigment dispersion liquid was ultra-centrifuged to obtain a yellow recording liquid having the pigment concentration of 9.0% by weight, a viscosity of 3.3 cps. and a surface tension of 35 dyne/cm, from which coarse particles were removed.

| Recording Liquid B2 | |
|---|---|
| Phthalocyanine blue | 15 parts by weight |
| Polymer obtained in Preparing Example 3 | 18 parts by weight |
| Water | 45 parts by weight |
| γ-Butyl lactone | 22 parts by weight |

A blue recording liquid having the abovementioned constitution was prepared in the same manner as in above-mentioned Recording Liquid A. The resulting aqueous pigments dispersion liquid had a pigment concentration of 14.5% by weight, a viscosity of 6 cps., and a surface tension of 41 dyne/cm.

| Recording Liquid C2 | |
|---|---|
| Carbon black | 28 parts by weight |

| Recording Liquid C2 (continued) | |
|---|---|
| Polymer obtained in Preparing Example 4 | 15 parts by weight |
| Water | 40 parts by weight |
| Propylene carbonate | 20 parts by weight |
| Triethylene glycol monomethyl ether | 17 parts by weight |

An aqueous pigments dispersion liquid having the above-mentioned constitution was prepared in the same manner as in Example 1. This dispersion liquid had a pigment concentration of 7.7% by weight, a viscosity of 5.5 cps., a surface tension of 39 dyne/cm, and black color.

| Recording Liquid D2 | |
|---|---|
| Titanium white | 12 parts by weight |
| Polymer obtained in Preparing Example 5 | 18 parts by weight |
| Water | 50 parts by weight |
| N—Methylpyrollidone | 20 parts by weight |

An aqueous pigments dispersion liquid having the above-mentioned constitution was prepared in the same manner as in Example 1. This dispersion liquid had a pigment concentration of 10.8% by weight, a viscosity of 8 cps., a surface tension of 40.5 dyne/cm, and white color.

EXAMPLE 5

20 parts by weight of polymer obtained in Preparing Example 6, 10 parts by weight of Brilliant Fast Scarlet, 15 parts by weight of polyoxymethylene polyoxypropylene monomethyl ether (trade name: UNISAVE LM-2; supplied by NIPPON OILS & FATS CO., LTD.), and 20 parts of water were mixed and stirred in a Homomixer for 8 hours, 20 parts of water and 15 parts of UNISAVE LM-2 were further added to adjust the pigment concentration, stirred for 20 minutes. The thus obtained red aqueous pigment dispersion liquid was ultracentrifuged to obtain a recording liquid having a pigment concentration of 9.5% by weight, a viscosity of 8 cps., and a surface tension of 35.5 dyne/cm, from which coarse particles were removed. By using the recording liquid, the tests $T_1$ through $T_5$ were carried out in the same manner as in Example 1. The recording liquid showed excellent characteristics.

Further, concerning the change of viscosity versus temperature, the composition showed a viscosity of 15 cps. at 0° C. and 4 cps. at 40° C. This shows that the obtained liquid is excellent as the ink for an ink-jet system.

EXAMPLE 6

6 parts of styrene - maleate copolymer (molecular weight about 1,500; trade name: SMA RESIN 1440H; supplied by ARCO CHEMICAL INC.), 2 parts of triethanolamine, 60 parts of water, 25 parts of ethylene glycol, and 7 parts of Phthalocyamine blue (molecular weight: 560) were mixed and dispersed in a ball-mill for 50 hours to obtain a pigment dispersion liquid. The thus obtained dispersion liquid was ultracentrifuged to obtain a recording liquid for ink-jet system, from which nondispersed coarse particles were removed. The average particle diameter of the pigment was 1.1 microns to satisfy the foregoing Equation (1).

By using the obtained recording liquid, the tests of printing characteristics were carried out by a recording apparatus equipped with an on-demand type recording head (ejecting orifice of 50 microns in diameter, driving voltage for a piezo-oscillator of 60 volts, frequency of 4 KHz) which causes the recording liquid to be ejected by a piezo-oscillator. And in the same manner as the above, the tests were carried out by a recording apparatus equipped with an on-demand type multi recording head (ejecting orifice of 35 microns in diameter, heating resistor of 150 ohms. in resistance value, driving voltage of 30 volts, frequency of 2 KHz) which generates droplets for recording by applying heat energy to the recording liquid in the recording head.

In all cases, recorded images had excellent light fastness and water resisting property, and images were clear in color tone and had high density. Also, in recorded images, no spreading and no sliding of the ink were observed, images of dot were streamlined in the border and further the recording liquid showed excellent fixability. Even after storage for a long time, no particle of pigment was coagulated, and precipitated, and stable ejection could be carried out.

EXAMPLE 7

A dispersion liquid was obtained by mixing and dispersing 6 parts of diisobutylene - maleate copolymer (molecular weight: about 10,000), one part of ethanolamine, 11 parts of diethylene glycol, 75 parts of water, and 7 parts of Anthanthrone orange in a ball-mill for 48 hours. After coarse particles were removed, the average particle diameter of the pigment was 1.2 microns and satisfied the foregoing Equation (1). By using the liquid, the tests were carried out in the same manner as in Example 6. Excellent results were obtained as in Example 6.

EXAMPLE 8

5 parts of condensed naphthaline sulfonate (molecular weight: about 1,200; trade name: DEMOLE N; supplied by KAO ATLAS INC.), 10 parts of morpholine, 20 parts of glycerol, 60 parts of water and 5 parts of Para red were mixed and dispersed in a ball-mill for 48 hours to obtain a dispersion liquid. The average particle diameter of pigment of the liquid from which coarse particles were removed was 0.46 micron and satisfied the foregoing Equation (1). By using the liquid, the tests were carried out in the same manner as in Example 6. Excellent results were obtained as in Example 6.

EXAMPLE 9

10 parts of ammonium polyacrylate (molecular weight: about 2,000), 20 parts of diethylene glycol, 65 parts of water, and 5 parts of Bordeaux 5B were mixed and dispersed in a ball-mill for 48 hours to obtain a dispersion liquid. After coarse particles were removed, the average particle diameter of the pigment was 0.85 micron and satisfied the foregoing Equation (1). By using the liquid, the tests were carried out in the same manner as in Example 6. Excellent results were obtained as in Example 6.

EXAMPLE 10

5 parts of ethyl acrylate - sodium acrylate copolymer (molecular weight: about 5,000), 50 parts of water, 35 parts of ethylene glycol, and 10 parts of Pyrazorone red B were mixed and dispersed in a ball-mill for 48 hours to obtain a dispersion liquid. After coarse particles were removed, the average particle diameter of the pigment was 1.3 microns and satisfied the abovementioned Equation (1). By using the liquid, the tests were carried out in the same manner as in Example 6. Excellent results were obtained as in Example 6.

EXAMPLE 11

5 parts of styrene - octyl acrylate - monomethyl itaconate copolymer (molecular weight: about 8,000), 10 parts of N-Morpholine, 17 parts of diacetone alcohol, 60 parts of water, and 8 parts of Benzidine Yellow G were mixed and dispersed in a ball-mill for 48 hours to obtain a dispersion liquid. The average particle diameter of pigment of the liquid from which coarse particles were removed was 2.4 microns and satisfied the abovementioned Equation (1). By using the liquid, the tests were carried out in the same manner as in Example 6. Excellent results were obtained as in Example 6.

EXAMPLE 12

15 parts of polymer obtained in Preparing Example 1, one part of morpholine, 30 parts of water, 20 parts of diethylene glycol monoethyl ether, and 5 parts of Phthalocyanine blue were mixed and dispersed in a ball-mill to obtain a pigment dispersion liquid. The thus obtained dispersion liquid was ultra-centrifuged to obtain a recording liquid for ink-jet system, from which non-dispersed coarse particles were removed. The average particle diameter of pigment was 2.1 microns to satisfy the abovementioned Equation (1).

By using the recording liquid, the tests of printing characteristics were carried out by a recording apparatus equipped with an on-demand type recording head (ejecting orifice of 50 microns in diameter, driving voltage for a piezo-oscillator of 60 volts, frequency of 4 KHz) which causes the recording liquid to be ejected by a piezo-oscillator. And, in the same manner as the above, the tests were carried out by a recording apparatus equipped with an on-demand type multi recording head (ejecting orifice of 35 microns in diameter, heating resistor of 150 ohms in resistance value, driving voltage of 30 volts, frequency of 2 KHz) which generates droplets for recording by applying heat energy to the recording liquid in the recording head.

In all cases, recorded images had excellent light fastness and water resisting property, and images were clear in color tone and had high density. Also, in recorded images, no spreading and no sliding of the ink were observed, images of dot were streamlined in the border and further the recording liquid showed excellent fixability. Even after storage for a long time, no particles of pigment coagulated and precipitated, and stable ejection could be carried out.

EXAMPLE 13

25 parts of polymer obtained in Preparing Example 2, one part of ethanolamine, 75 parts of water, and 7 parts of Anthanthrone orange were mixed and dispersed in a ball-mill for 48 hours to obtain a dispersion liquid. The average particle diameter of pigment of the liquid from which coarse particles were removed was 1.2 microns and satisfied the abovementioned Equation (1). By using the liquid, the tests were carried out in the same manner as in Example 6. Excellent results were obtained as in Example 6.

EXAMPLE 14

20 parts of polymer obtained in Preparing Example 3, one part of morpholine, 30 parts of water, and 5 parts of Para red were mixed and dispersed in a ball-mill for 48 hours to obtain a dispersion liquid. The average particle diameter of pigment of the liquid from which coarse particles were removed was 0.46 micron and satisfied the abovementioned Equation (1). By using the liquid, the tests were carried out in the same manner as in Example 6. Excellent results were obtained as in Example 6.

EXAMPLE 15

15 parts of polymer obtained in Preparing Example 4, 15 parts of diethylene glycol, 50 parts of water, and 5 parts of Bordeaux 5B were mixed and dispersed in a ball-mill for 48 hours to obtain a dispersion liquid. The average particle diameter of pigment of the liquid from which coarse particles were removed was 0.85 micron and satisfied the abovementioned Equation (1). By using the liquid, the tests were carried out in the same manner as in Example 6. Excellent results were obtained as in Example 6.

EXAMPLE 16

20 parts of polymer obtained in Preparing Example 5, 50 parts of water, and 4 parts of Pyrazolone red B were mixed and dispersed in a ball-mill for 48 hours to obtain a dispersion liquid. The average particle diameter of pigment of the liquid from which coarse particles were removed was 1.3 microns and satisfied the abovementioned Equation (1). By using the liquid, the tests were carried out in the same manner as in Example 6. Excellent results were obtained as in Example 6.

EXAMPLE 17

25 parts of polymer obtained in Preparing Example 6, one part of N-Methylmorpholine, 60 parts of water, and 8 parts of Benzidine yellow G were mixed and dispersed in a ball-mill for 48 hours to obtain a dispersion liquid. The average particle diameter of pigment of the liquid from which coarse particles were removed was 2.4 microns and satisfied the abovementioned Equation (1). By using the liquid, the tests were carried out in the same manner as in Example 6. Excellent results were obtained as in Example 6.

COMPARATIVE EXAMPLE

Dispersion liquids in which the average particle diameters did not satisfy the abovementioned Equation (1) were prepared in the same manner as in the abovementioned Example 12 through 17, except for changing the dispersion times in a ball-mill.

(1) In Example 12, a dispersion time was 24 hours.
(2) In Example 13, a dispersion time was 24 hours.
(3) In Example 14, a dispersion time was 36 hours.
(4) In Example 15, a dispersion time was 36 hours.
(5) In Example 16, a dispersion time was 24 hours.
(6) In Example 17, a dispersion time was 12 hours.

(1) An average particle diameter was 3.0 microns.
(2) An average particle diameter was 1.8 microns.
(3) An average particle diameter was 0.88 microns.
(4) An average particle diameter was 1.3 microns.
(5) An average particle diameter was 1.8 microns.
(6) An average particle diameter was 4.2 microns.

During the storage of these dispersion liquids, pigment particles tended to coagulate and precipitate, and therefore the liquids were unsuitable for practical use.

EXAMPLE 18

6 parts of styrene - maleate copolymer (molecular weight about 1,500; trade name: SMA RESIN 1440H; supplied by ARCO CHEMICAL INC.), 2 parts of triethanolamine, 60 parts of water, 25 parts of ethylene glycol, and 7 parts of Phthalocyanine blue (molecular weight: 560) were mixed and dispersed in a ball-mill for 48 hours to obtain a pigments dispersion liquid (the ratio of the molecular weight of the pigment to the average molecular weight of the polymer $W_1/W_2 = 1/2.7$). The obtained dispersion liquid was ultra-centrifuged to obtain a recording liquid for ink-jet system, from which non-dispersed coarse particles were removed. By using the recording liquid, the tests of printing characteristics were carried out by a recording apparatus equipped with an on-demand type recording head (ejecting orifice of 50 microns in diameter, driving voltage for a piezo-oscillator of 60 volts, frequency of 20 KHz) which causes the recording liquid to be ejected by a piezo-oscillator.

And, in the same manner as the above, the tests were carried out by a recording apparatus equipped with an on-demand type multi recording head (ejecting orifice of 35 microns in diameter, heating resistor of 150 ohms in resistance value, driving voltage of 30 volts, frequency of 5 KHz) which generates droplets for recording by applying heat energy to the recording liquid in the recording head.

In all cases, recorded images had excellent light fastness and water resisting property, and images were clear in color tone and had high density. Also, in recorded images, no spreading and no sliding of the ink were observed, images of dot were streamlined in the border and further the recording liquid showed excellent fixability. Even after storage for a long time, no particles of pigment coagulated and precipitated, and stable ejection could be carried out.

EXAMPLE 19

6 parts of diisobutylene - maleate copolymer (molecular weight: about 10,000), 10 parts of morpholine, 17 parts of diethylene glycol, 60 parts of water, and 7 parts of Anthanthrone orange (molecular weight: about 456) were mixed and dispersed in a ball-mill for 48 hours to obtain a dispersion liquid ($W_1/W_2 = 1/22$). By using the liquid from which coarse particles were removed, the tests were carried out in the same manner as in Example 18 to obtain excellent results same as in Example 18.

EXAMPLE 20

5 parts of condensed naphthalinesulfonate (molecular weight: about 1,200; trade name: DEMOL N; supplied by KAO ATLAS INC.), one part of ethanolamine, 20 parts of glycerol, 74 parts of water, and 5 parts of Para red (molecular weight: about 265) were mixed and dispersed in a ball-mill for 48 hours to obtain a dispersion liquid ($W_1/W_2 = 1/4.5$). By using the liquid from which coarse particles were removed, the tests were carried out in the same manner as in Example 18 to obtain excellent results same as in Example 18.

EXAMPLE 21

10 parts of ammonium polyacrylate (molecular weight: about 2,000), 20 parts of diethylene glycol monoethyl ether, 64 parts of water, and 6 parts of Bordo 5B (molecular weight: about 270) were mixed and dispersed in a ball-mill for 48 hours to obtain a dispersion liquid ($W_1/W_2=1/7.4$). By using the liquid from which coarse particles were removed, the tests were carried out in the same manner as in Example 18 to obtain excellent results same as in Example 18.

EXAMPLE 22

5 parts of ethyl acrylate - acrylic acid copolymer (molecular weight: about 5,000), 40 parts of water, 45 parts of ethylene glycol, and 10 parts of Pyrazolone red B (molecular weight: about 738) were mixed and dispersed in a ball-mill for 48 hours to obtain a dispersion liquid ($W_1/W_2=1/6.8$). By using the liquid from which coarse particles were removed, the tests were carried out in the same manner as in Example 18 to obtain excellent results same as in Example 18.

EXAMPLE 23

5 parts of styrene - octyl acrylate - monoethyl itaconate copolymer (molecular weight: about 8,000), one part of triethanolamine, 59 parts of water, 25 parts of diethylene glycol monoethyl ether, and 10 parts of Benzidine yellow G (molecular weight: about 720) were mixed and dispersed in a ball-mill for 48 hours to obtain a dispersion liquid ($W_1/W_2=1/11$). By using the liquid from which coarse particles were removed, the tests were carried out in the same manner as in Example 18 to obtain excellent results same as in Example 18.

EXAMPLE 24

20 parts of polymer obtained in Preparing Example 1, 50 parts of water, 20 parts of ethylene glycol, and 5 parts of Phthalocyanine blue (molecular weight: about 560) were mixed and dispersed in a ball-mill for 48 hours to obtain a pigments dispersion liquid (the ratio of the molecular weight of the pigment to the average molecular weight of the polymer $W_1/W_2=1/89$). The obtained dispersion liquid was ultracentrifuged to obtain a recording liquid for ink-jet system, from which non-dispersed coarse particles were removed. By using the recording liquid, the tests were carried out in the same manner as in Example 18. Excellent results were obtained as in Example 18.

EXAMPLE 25

20 parts of polymer obtained in Preparing Example 2, one part of morpholine, 60 parts of water, and 7 parts of Anthanthrone orange (molecular weight: about 456) were mixed and dispersed in a ball-mill for 48 hours to obtain a dispersion liquid ($W_1/W_2=1/66$). By using the liquid from which coarse particles were removed, the tests were carried out in the same manner as in Example 18 to obtain excellent results same as in Example 18.

EXAMPLE 26

25 parts of polymer obtained in Preparing Example 3, one part of ethanolamine, 25 parts of water, and 5 parts of Para red (molecular weight: about 265) were mixed and dispersed in a ball-mill for 48 hours to obtain a dispersion liquid ($W_1/W_2=1/57$). By using the liquid from which coarse particles were removed, the tests were carried out in the same manner as in Example 18 to obtain excellent results same as in Example 18.

EXAMPLE 27

20 parts of polymer obtained in Preparing Example 4, 10 parts of diethylene glycol monomethyl ether, 40 parts of water, and 6 parts of Bordeaux 5B (molecular weight: about 270 were mixed and dispersed in a ball-mill for 48 hours to obtain a dispersion liquid ($W_1/W_2=1/74$). By using the liquid from which coarse particles were removed, the tests were carried out in the same manner as in Example 18 to obtain excellent results same as in Example 18.

EXAMPLE 28

15 parts of polymer obtained in Preparing Example 5, 40 parts of water, the Pyrazolone red B (molecular weight: about 738) were mixed and dispersed in a ball-mill for 48 hours to obtain a dispersion liquid ($W_1/W_2=1/41$). By using the liquid from which coarse particles were removed, the tests were carried out in the same manner as in Example 18 to obtain excellent results same as in Example 18.

EXAMPLE 29

15 parts of polymer obtained in Preparing Example 6, one part of triethanolamine, 45 parts of water, 15 parts of ethylene glycol monoethyl ether, and 5 parts of Benzidine yellow G (molecular weight: about 720) were mixed and dispersed in a ball-mill for 48 hours to obtain a dispersion liquid ($W_1/W_2=1/111$). By using the liquid from which coarse particles were removed, the tests were carried out in the same manner as in Example 18 to obtain excellent results same as in Example 18.

EXAMPLE 30

| | |
|---|---|
| Copper phthalocyanine blue (pigment) | 8 parts by weight |
| Polymer obtained in the Preparing Example 1 | 15 parts by weight |
| Dimethylethanolamine | 1 part by weight |
| Ethylene glycol | 10 parts by weight |
| Water | 19 parts by weight |

After the abovementioned components were all dispersed in a ball-mill for about 18 hours, one part of ethylene glycol and 26 parts of water were further added to obtain the pigment concentration of about 10% and dispersed for 30 minutes to obtain a blue pigment dispersion liquid. The thus obtained dispersion liquid was centrifuged to obtain a recording liquid from which non-dispersed particles were removed. (viscosity: about 4 cps.). By using the recording ink, the tests $T_1$–$T_5$ described below were carried out by a recording apparatus equipped with an on-demand type recording head (ejecting orifice of 50 microns in diameter, driving voltage for a piezo-oscillator of 60 volts, frequency of 4 KHz) which causes the recording liquid to be ejected by a piezo-oscillator. Excellent results were obtained for all cases. The diameter of the ejecting orifice may be set in a range of 10–200 microns.

($T_1$) Storage stability of recording liquid:

The recording liquid sealed in a glass vessel was stored for six months at both temperatures of −30° C. and 60° C. No insoluble material separated out, nor did the physical properties and color of the recording liquid change.

($T_2$) Ejection stability:

Continuous ejection was carried out for 24 hours at room temperature, 5° C., and 40° C. respectively. Under all the conditions, highly excellent and stable recording could be accomplished throughout.

($T_3$) Ejection responsiveness:

The ejection test was carried out for an intermittent ejection once every two seconds, and an ejection after the liquid stood in the orifice for two months. In no cases, was clogging at the tip of the orifice observed, and recording was carried out stably and uniformly.

($T_4$) Quality of recorded image:

Images recorded on the fabrics listed in the following table had high density and were clear. After a recorded image was exposed for six months to light in a room the decrease in the degree of the image density was less than 1%. In the case of dipping a recorded image for one minute in water, spreading of the ink was slight.

($T_5$) Color fastness to washing of various printed fabrics:

The fabrics listed in the following table were recorded with an image and set by heating for 5 minutes at 150° C. By using the thus obtained fabrics, the tests for washing by detergent and by dry-cleaning were carried out by a washing machine according to the conventional method. Excellent fastness was obtained for all cases.

Fabrics:
(1) TETRON polyester fiber - cotton blended yarn fabric
(2) Cotton shirting
(3) NYLON taffeta
(4) ACETATE fabric
(5) KASHMILON acrylic fabric
(6) BEMBERG cuprous ammonium rayon, crepe de Chine
(7) Rayon filament fabric
(8) Rayon staple fiber, mousseline

EXAMPLE 31

In the same manner as in Example 30, the recording liquids of the following compostions were prepared, and the tests ($T_1$-$T_5$) were carried out on each of the resulting recording liquids. All of the recording liquids showed excellent recording characteristics.

And, by using the recording ink, the tests in the same manner as in Example 30 were carried out by a recording apparatus shown in FIG. 4, equipped with an on-demand type multi recording head (ejecting orifice of 35 microns in diameter, heating resistor of 150 ohms in resistance value, driving voltage of 30 volts, frequency of 2 KHz) which generates droplets for recording by applying heat energy to the recording liquid in the recording head. Excellent results were obtained for all cases.

| Recording Liquid A3 | |
| --- | --- |
| Carbon black (pigment) | 10 parts by weight |
| Polymer obtained in Preparing Example 7 | 15 parts by weight |
| Dimethylaminoethanol | 1 part by weight |
| Ethylene glycol | 10 parts by weight |
| Water | 19 parts by weight |

After the abovementioned components were all dispersed in a ball-mill for about 18 hours, one part of ethylene glycol and 26 parts of water were further added to obtain the pigment concentration of about 10% and dispersed for 30 minutes to obtain a black pigment dispersion liquid.

The thus obtained dispersion liquid was centrifuged to obtain a recording liquid, from which non-dispersed particles were removed. (viscosity: about 5 cps.).

| Recording Liquid B3 | |
| --- | --- |
| Copper phthalocyanine blue (pigment) | 15 parts by weight |
| Polymer obtained in Preparing Example 2 | 15 parts by weight |
| Morpholine | 1 part by weight |
| Ethylene glycol | 5 parts by weight |
| Diethylene glycol | 5 parts by weight |
| Water | 19 parts by weight |

After the abovementioned components were all dispersed in a sand-mill for about 18 hours, 25 parts of ethylene glycol 5 parts of diethylene glycol and 80 parts of water were further added to obtain the pigment concentration of about 10% and dispersed for 30 minutes to obtain a blue pigment dispersion liquid. The thus obtained dispersion liquid was centrifuged to obtain a recording liquid, from which non-dispersed particles were removed. (viscosity: about 6 cps.).

| Recording Liquid C3 | |
| --- | --- |
| Copper phthalocyanine blue (pigment) | 8 parts by weight |
| Polymer obtained in Preparing Example 10 | 10 parts by weight |
| N—Methylmorpholine | 1 part by weight |
| Ethylene glycol | 10 parts by weight |
| Water | 19 parts by weight |

After the abovementioned components were all dispersed in a ball-mill for about 15 hours, one part of ethylene glycol and 40 parts of water were further added to obtain the pigment concentration of about 10% and dispersed for 30 minutes to obtain a blue pigment dispersion liquid. The thus obtained dispersion liquid was centrifuged to obtain a recording liquid from which non-dispersed particles were removed. (viscosity: about 4.5 cps.).

| Recording Liquid D3 | |
| --- | --- |
| Quinacridone (pigment) | 8 parts by weight |
| Polymer obtained in Preparing Example 8 | 15 parts by weight |
| Dimethylaminoethanol | 1 part by weight |
| Ethylene glycol | 8 parts by weight |
| Diethylene glycol | 2 parts by weight |
| Water | 20 parts by weight |

After the abovementioned components were all dispersed in a sand-mill for about 2 hours, 5 parts of ethylene glycol and 30 parts of water were further added to obtain the pigment concentration of about 7% and dispersed for 30 minutes to obtain a red pigment dispersion liquid. The thus obtained dispersion liquid was centrifuged to obtain a recording liquid from which non-dispersed particles were removed. (viscosity: about 5 cps.).

| Recording Liquid E3 | |
| --- | --- |
| Carbon black (pigment) | 18 parts by weight |
| Polymer obtained in Preparing Example 9 | 20 parts by weight |
| Dimethylaminoethanol | 1 part by weight |
| Ethylene glycol | 10 parts by weight |

| Recording Liquid E3 | |
|---|---|
| Water | 20 parts by weight |

After the abovementioned components were all dispersed in a ball-mill for about 10 hours, 20 parts of ethylene glycol and 40 parts of water were further added to obtain the pigment concentration of about 8% and dispersed for 20 minutes to obtain a black pigment dispersion liquid. The thus obtained dispersion liquid was centrifuged to obtain a recording liquid, from which non-dispersed particles were removed. (viscosity: about 8 cps.).

What we claim is:

1. An ink-jet recording process which comprises forming droplets of an ink and recording on an image receiving material by using the droplets, said ink being prepared by dispersing fine particles of pigment into an aqueous dispersion medium containing a polymer which has both an ethylenically unsaturated carboxylic acid substituent as a hydrophilic portion and an aromatic ring substituent as a hydrophobic portion and an average molecular weight sufficient to contribute to the dispersion stability of said pigment particles without increasing the viscosity of the ink higher than about 20 cps and wherein said hydrophilic portion constitutes from 2 to 40 weight percent of said polymer.

2. A process according to claim 1 in which droplets are formed after said ink is projected from a fine opening of 10 microns to 200 microns in diameter.

3. A process according to claim 1 in which viscosity of the ink is a value in the range from 1–20 cps.

4. A process according to claim 1 in which the polymer forms a salt with a member selected from the group consisting of alkali metal, aliphatic amine, alcoholamine, morpholine, and N-methyl morpholine.

5. A process according to claim 1 in which the hydrophilic portion is introduced into the polymer by using a member selected from the group consisting of acrylic acid, methacrylic acid, crotonic acid, itaconic acid, itaconic acid mono-ester, maleic acid, maleic acid mono-ester, fumaric acid, and fumaric acid mono-ester.

6. A process according to claim 1 in which the hydrophobic portion is introduced into the polymer by using a member selected from the group consisting of styrene, and styrene derivatives.

7. A process according to claim 1 in which the polymer is a copolymer.

8. A process according to claim 1 in which the polymer is used in an amount of the range from 5 to 300 parts by weight per 100 parts by weight of pigment.

9. A process according to claim 1 in which the aqueous dispersion medium consists of water.

10. A process according to claim 1 in which the aqueous dispersion medium consists of a mixture of water and water-soluble organic solvent.

11. A process according to claim 1 in which the image receiving material is paper.

12. A process according to claim 1 in which the image receiving material is fabric.

13. A process according to claim 1 in which the hydrophobic portion is introduced into the polymer by using a member selected from the group consisting of styrene, styrene derivatives.

* * * * *

UNITED STATES PATENT AND TRADEMARK OFFICE
CERTIFICATE OF CORRECTION

PATENT NO. : 4,597,794
DATED : July 1, 1986
INVENTOR(S) : TOKUYA OHTA, ET AL.

It is certified that error appears in the above-identified patent and that said Letters Patent is hereby corrected as shown below:

COLUMN 9

Line 55,   "n =3-10' should read
           --n = 3-10
           trade name: DEMOL N (KAO ATLAS INC)--.

COLUMN 13

Line 68,   "28" should read --8--.

COLUMN 19

Line 1,    "Bordo" should read --Bordeaux--.

COLUMN 20

Line 6,    "270" should read --270)--.

Signed and Sealed this

Thirty-first Day of March, 1987

Attest:

DONALD J. QUIGG

Attesting Officer    Commissioner of Patents and Trademarks